United States Patent
Wilson-Langman et al.

(10) Patent No.: US 10,082,561 B2
(45) Date of Patent: Sep. 25, 2018

(54) SYMBIOTIC RADAR AND COMMUNICATION SYSTEM

(71) Applicant: UNIVERSITY OF CAPE TOWN, Cape Town (ZA)

(72) Inventors: Alan Wilson-Langman, Pleasant Hill, IA (US); Michael Raymond Inggs, Simonstown (ZA); Amit Kumar Mishra, Cape Town (ZA)

(73) Assignee: UNIVERSITY OF CAPE TOWN, Cape Town (ZA)

( * ) Notice: Subject to any disclaimer, the term of this patent is extended or adjusted under 35 U.S.C. 154(b) by 498 days.

(21) Appl. No.: 14/768,382

(22) PCT Filed: Feb. 17, 2014

(86) PCT No.: PCT/IB2014/059036
§ 371 (c)(1),
(2) Date: Aug. 17, 2015

(87) PCT Pub. No.: WO2014/125447
PCT Pub. Date: Aug. 21, 2014

(65) Prior Publication Data
US 2015/0378004 A1 Dec. 31, 2015

(30) Foreign Application Priority Data
Feb. 18, 2013 (ZA) .............................. 2013/01224

(51) Int. Cl.
*G01S 7/00* (2006.01)
*G01S 13/00* (2006.01)
(Continued)

(52) U.S. Cl.
CPC .............. *G01S 7/006* (2013.01); *G01S 7/003* (2013.01); *G01S 13/003* (2013.01);
(Continued)

(58) Field of Classification Search
CPC ...................................................... G01S 7/006
(Continued)

(56) References Cited

U.S. PATENT DOCUMENTS

| 6,486,827 | B2* | 11/2002 | Small | ........................ | G01S 7/28 |
| | | | | | 342/13 |
| 2002/0003488 | A1* | 1/2002 | Levin | ...................... | G01S 7/023 |
| | | | | | 342/70 |
| 2014/0350792 | A1* | 11/2014 | Schrabler | .............. | G01S 13/003 |
| | | | | | 701/41 |

OTHER PUBLICATIONS

Samczynski, P. et al, "A Concept of GSM-based Passive Radar for Vehicle Traffic Monitoring"; Microwaves,Radar and Remote Sensing Symposium (MRRS), XP032063640, IEEE, Aug. 25-27, 2011, pp. 271-274.*

Inggs, M.R. et al, "Modelling and Simulation in Commensal Radar System Design"; IET Conference Publications—IET International Conference on Radar Systems, Radar 2012, 2012.*

(Continued)

*Primary Examiner* — Peter M Bythrow
*Assistant Examiner* — Helena H Seraydaryan
(74) *Attorney, Agent, or Firm* — Osha Liang LLP

(57) ABSTRACT

A symbiotic radar and communication system is disclosed. The system includes a plurality of base stations in communication with a wider communication network, each base station being configured to transmit and receive communication signals to and from a plurality of user terminals. The system performs communication data processing and radar data processing on received signals so that target object reflections contained therein can be resolved. Preferably, initial radar data processing is performed at each base station which embeds time and position information into the data and communicates it to a central radar server, the central server combining the received data from several of the base stations into a single range resolution profile.

16 Claims, 4 Drawing Sheets

(51) Int. Cl.
    *G01S 13/72*         (2006.01)
    *G01S 13/87*         (2006.01)
    *G01S 13/91*         (2006.01)

(52) U.S. Cl.
    CPC .......... *G01S 13/726* (2013.01); *G01S 13/878* (2013.01); *G01S 13/91* (2013.01)

(58) Field of Classification Search
    USPC .......................................................... 342/57
    See application file for complete search history.

(56) References Cited

OTHER PUBLICATIONS http://web.archive.org/web/20120110095717/https://en.wikipedia.org/wiki/Network_Time_Protocol.*

Quan, S. et al, "Radar-Communication Integration: An Overview", "http://ieeexplore.ieee.org/stamp/stamp.jsp?arnumber=7019537", IEEE Xplore, 2014.*

International Search Report issued in PCT/IB2014/059036 dated Jun. 23, 2014 (3 pages).

Samczynski, P. et al; "A Concept of GSM-based Passive Radar for Vehicle Traffic Monitoring"; Microwaves, Radar and Remote Sensing Symposium (MRRS), XP032063640, IEEE, Aug. 25-27, 2011, pp. 271-274 (4 pages).

Inggs, M. R. et al; "Modelling and Simulation in Commensal Radar System Design", IET Conference Publications—IET International Conference on Radar Systems, Radar 2012, 2012 Institution of Engineering and Technology GBR, vol. 2012, No. 603 CP, 2012, XP002725701, (5 pages).

* cited by examiner

SYMBIOTIC RADAR AND COMMUNICATION SYSTEM

FIELD OF THE INVENTION

This invention relates to radar and communications systems and, more specifically, to a symbiotic radar and communication system.

BACKGROUND TO THE INVENTION

A commensal radar system is a radar system that utilises the emissions of other services without impacting at all on those emissions. A commensal radar system makes use of existing transmitters of opportunity to detect and range target objects, where there may be a single transmitter of opportunity and a plurality of separate commensal receivers, or vice versa. The transmitters of opportunity illuminate a scene with electromagnetic transmissions which may be constrained to a particular band, in accordance with the function of each transmitter. The separate receivers may then be configured to receive emissions from these transmitters which are reflected off target objects situated within the illuminated scene.

The term "commensal" is used as these radar systems typically operate alongside existing electromagnetic transmitters (transmitters of opportunity), utilising their transmissions without adversely affecting the electromagnetic transmitters or the intended recipients of these transmissions.

Target objects which may be detected by commensal radar systems can include cars, aircraft, ships, animals or humans. Targets are detected by cross-correlating a direct path reference signal (which is obtained directly from the transmitter of opportunity) with a surveillance channel signal. Peaks in the output of the cross-correlated signal correspond to targets. The delay at which a peak occurs corresponds to the bistatic range of the target, where the bistatic range is the range from the transmitter to the target to the receiver. A commensal radar system may also measure a Doppler-shift of the reflected transmissions so as to allow for moving targets to be differentiated from stationary targets.

Transmitters of opportunity can take the form of any electromagnetic transmitter. Some examples of transmitters of opportunity include GSM (Global System for Mobile communication) base station transmitters, Wi-Fi access points, broadcast transmitters (e.g. television or radio broadcast transmitters), or even space-born transmitters such as Global Navigation Satellite System (GNSS) transmissions. Favoured transmitters of opportunity are typically those with a relatively high output power and a reasonably high bandwidth. Transmitters meeting such requirements include digital audio broadcast (DAB) transmitters, analogue and digital TV broadcast transmitters and, to a lesser extent, FM radio broadcast transmitters.

The transmit power of the transmitters of opportunity influences the maximum detection range of the transmitters of opportunity, with a higher transmit power meaning that targets can be detected from a greater distance. The bandwidth of the electromagnetic transmissions being broadcast is inversely proportional to the resolution of the range measurements of the system. Electromagnetic transmissions of a higher bandwidth accordingly provide for improved differentiability of closely spaced targets.

Transmitters of opportunity are, however, not commissioned and/or installed with commensal radar functionality in mind. It is therefore a further requirement for favourability that the transmitters of opportunity be widely deployed so as to enhance the detection coverage of commensal radars.

Some of the challenges that exist for commensal radar systems concern poor signal to noise ratios, which may stem from difficulties in suppressing the direct path signal as well as relatively weak target returns. As the transmitters of opportunity are often continuous wave transmitters, the receivers should be able to operate concurrent to the transmitter, which means that they must be able to sufficiently suppress the electromagnetic transmission which propagates directly from the transmitter to the receiver. This is referred to as direct signal suppression, existing methods of which may include steering nulls of receiver antennas in the direction of transmitters of opportunity, making use of topography (i.e. using mountains to shield the receivers from the transmitters) or using software algorithms to suppress direct signals.

From a practical standpoint, null steering can be quite difficult as, in addition to the direct path electromagnetic transmissions, there can be strong electromagnetic reflections from stationary objects which may not fall in the antenna nulls. Topographical shielding is troublesome as the direct signal is still needed for target detection and software algorithms can be computationally intensive which may result in a higher system cost.

Some methods which have been proposed to overcome some of the difficulties involved in topographical shielding include receiving the reference signal at a separate receiver site and then communicating the reference signal and the surveillance signal to a central processor for cross-correlation. However such methods require communication links and accurate time stamping, which can be difficult to implement, especially in remote or rural areas.

SUMMARY OF THE INVENTION

In accordance with the invention there is provided a symbiotic radar and communication system comprising a plurality of base stations in communication with a wider communication network, each base station being configured to transmit and receive communication signals to and from a plurality of user terminals, wherein the system performs communication data processing and radar data processing on received signals so that target object reflections contained therein can be resolved.

Further features of the invention provide for each base station to include a transmitter configured to transmit signals that include digitally multiplexed data over a frequency band to the plurality of user terminals, a receiver configured to receive signals over a frequency band that at least partially overlaps with the transmitted frequency band, a radio frequency (RF) front-end configured to process the transmitted and received signals, a digitizer configured to digitize the received signals, radar processing modules configured to perform radar data processing on the received signals, and communication processing modules configured to perform communication processing on the received signals.

Still further features of the invention provide for the radar processing module to include a cross-correlation component which performs a cross-correlation of the digitized received signal and a stored replica of a section of the transmitted signal, a position information embedding component which embeds a time stamp and position information of the base station into the cross-correlated data, and a band information embedding component which embeds information as to the frequency band of the transmitted signal into the cross-correlated data.

Yet further features of the invention provide for the communication processing module to include a physical layer module, media access control (MAC) module, and a cognitive and internet protocol module which is operable to determine those bands of an available electromagnetic spectrum in which to transmit and receive signals.

In a preferred embodiment, the frequency band is in the Whitespace frequency band of about 50 MHz to about 850 MHz and the received signals include reflections of the transmitted signals.

Further features of the invention provide for the received frequency band to also include signals transmitted by one or more of the user terminals and for the base station to use the user terminal signals for synchronization of the radar system using network time protocol (NTP). In one embodiment, the base station stores replicas of the user terminal transmitted signals and the cross-correlation component also cross-correlates the received signal with the stored replicas of the user terminal transmitted signals so as to resolve target objects that have reflected off the user terminal transmitted signals.

The system preferably includes a central radar server in communication with the plurality of base stations and configured to further process radar data from the radar processing modules so as to track objects moving relative to the base stations. The radar server preferably includes a combining module which combines data from the cross-correlated signals that originate from the plurality of base stations to form one or a series of range profiles or amplitude-range-Doppler plots, so as to shift the data received from the plurality of base stations to properly align the cross-correlated data so as to resolve target object reflections contained therein, a constant false alarm rate (CFAR) detection module, which detects target objects in the range profile, and a range and Doppler extraction module which extracts target object range and Doppler information from the CFAR detection data and uses this information to track moving objects.

Further features of the invention provide for the received frequency band of one base station to include signals transmitted by one or more other base stations, and for the base stations to be in communication with each other through a communication backbone so that replicas of the signals transmitted by each base station are available at least at some other base stations for use in cross-correlation. In this way, a target object reflection received at a base station can be resolved even where the reflection originates from a signal transmitted by a different base station.

Still further features of the invention provide for each base station to digitally multiplex radar-specific signals into the transmitted communication signals, the radar-specific signals providing an optimized range and Doppler response to be extracted.

The invention extends to a method for providing symbiotic radar and communication functionality comprising, at a base station:
transmitting and receiving communication signals to and from a plurality of user terminals;
performing communication data processing on received signals;
substantially simultaneously and in parallel, performing at least initial radar data processing on the received signals.

Further features provide for the initial radar data processing to include cross-correlating the received signal with a stored replica of a section of the transmitted signal, embedding position information and time stamp information into the cross-correlated data, and embedding band information as to the frequency band of the transmitted signal into the cross-correlated data, and transmitting the resultant data to a central radar server for further radar processing so as to resolve target object position information.

Further features provide for the communication data processing to include receiving signals transmitted by one or more of the user terminals and using these user terminal signals for synchronization of the radar system using network time protocol; for the base station to store replicas of the user terminal transmitted signals and for the cross-correlation component to also cross-correlate the received signal with the stored replicas so as to resolve target objects that have reflected off the user terminal transmitted signals.

Still further features according to the method provide for each base station to digitally multiplex radar-specific signals into the transmitted communication signals, the radar-specific signals providing an optimized range and Doppler response to be extracted.

The invention further extends to a method carried out on a central radar server comprising:
receiving initially processed radar data from a plurality of base stations, each base station transmitting and receiving communication signals to and from a plurality of user terminals, wherein the initially processed radar data is generated by each base station cross-correlating received signals with stored replicas of transmitted signals and embedding position information and time stamp information into the cross-correlated data;
adjusting the received data based on the position and time stamp information to compensate for the position of each base station and the time that the received data was generated;
combining the received data from at least several of the base stations into a single range resolution profile; and
using the range resolution profile to resolve target object position information.

Further features according to the method provide for the central radar server to use a constant false alarm rate (CFAR) detection module to detect target objects in the range profile; and to use a range and Doppler extraction module to extract target object range and Doppler information from the CFAR detection data and use this information to track moving objects.

DETAILED DESCRIPTION WITH REFERENCE TO THE DRAWINGS

The invention provides for radar functionality, which may be commensal radar functionality, to be integrated into a communications system so as to provide a symbiotic radar and communication system. In a preferred embodiment, radar receivers, which may be commensal radar receivers, are integrated into whitespace communication base stations and a central radar server is provided.

A symbiotic radar system may refer to a radar system that coexists with a communication system on the same hardware platform and frequency spectrum to support both radar measurements as well as communication measurements. Radar functionality provided by embodiments of the invention may be that of a network radar and may thus also be dependent on the communication system. Communication functionality provided by embodiments of the invention, however can operate without the radar functionality.

Whitespace communications take advantage of the global migration from analogue television to digital television which allows for electromagnetic spectrum previously used by analogue television broadcasts to become available. These newly available spectrum bands are widely referred to as TV white spaces (TVWS) and occupy spectrum from about 50 MHz to 850 MHz.

A communications system making use of TVWS may be able to provide a high speed internet service to a plurality of users at long ranges. The number of users served by a single base station may be 512 or more at a maximum range of about 30 km or more. Such characteristics make whitespace communication systems well suited for rural areas where population densities are low.

As at least some spectrum may still be occupied by digital television transmissions in some geographical regions, whitespace communications systems may be secondary, or opportunistic, spectrum users and accordingly may have to be 'cognitive'. A cognitive radio (CR) is defined by the Federal Communications Commission (FCC) as being an intelligent wireless communications system capable of changing its transceiver parameters based on interaction with the environment in which it operates.

Thus a whitespace communications system may operate only in spectrum bands which it has determined to be available. There are various approaches which can be used by cognitive radios to determine which spectrum bands are available. Some approaches include making use of a geo-location database, spectrum sensing or beacon transmissions.

Whitespace communications have been standardised in the Institute of Electrical and Electronic Engineers' (IEEE) standard IEEE 802.22 which specifies an air interface of a point-to-multipoint wireless regional area network which is comprised of a fixed base station with fixed and portable user terminals. The standard provides for an orthogonal frequency division multiplexing (OFDM) modulation scheme, which may use quadrature phase shift keying (QPSK) or quadrature amplitude modulation (QAM). Transmitted waveforms may have bandwidths up to a few MHz.

Figure 1:
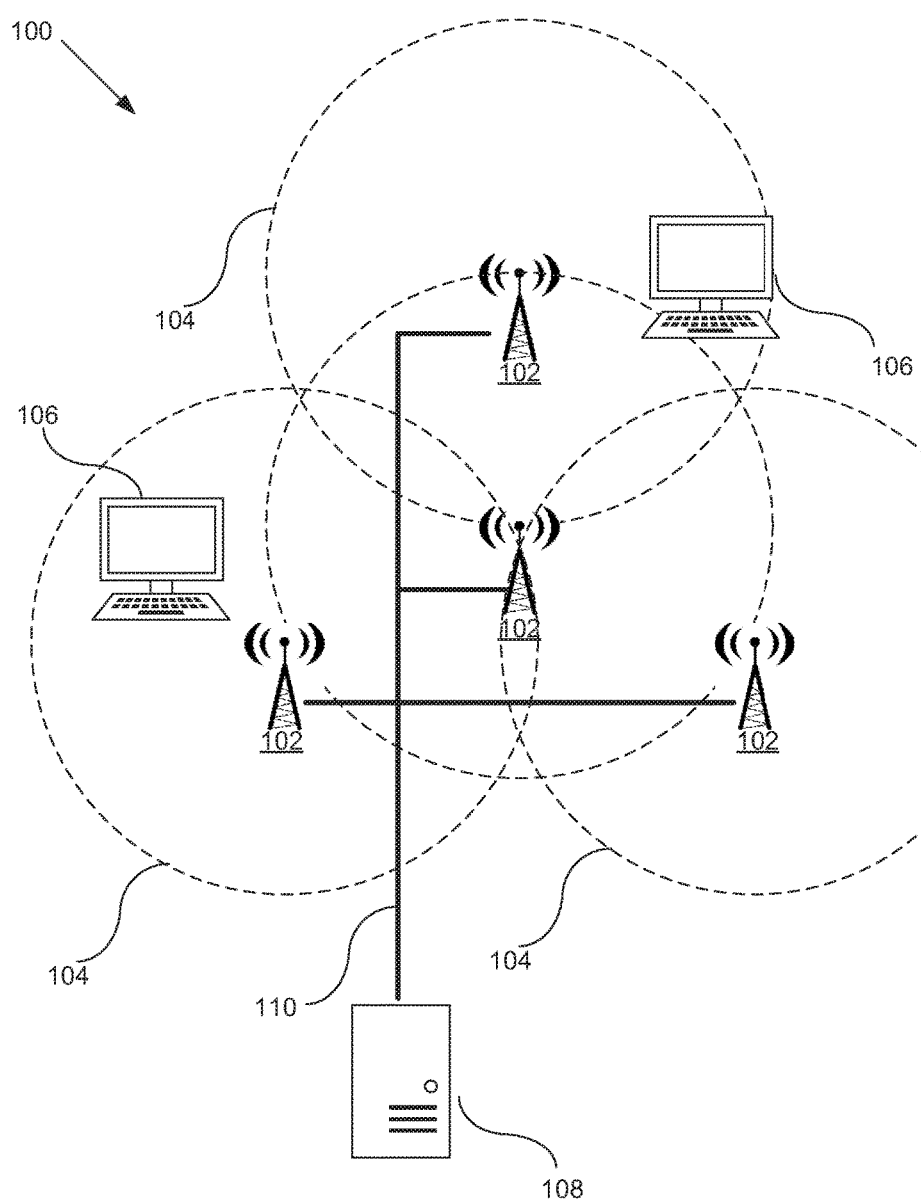
—
FIG. 1 is a block diagram illustrating a symbiotic radar and communication system according to the invention that includes a number of base stations.

A typical whitespace communication system may accordingly provide for a plurality of base stations in which each base station serves a plurality of users at ranges of up to 30 km or more. FIG. 1 illustrates an exemplary whitespace communication system (100) comprising a plurality of base stations (102) with theoretical maximum operating ranges (104) delimited. Every location in the field of interest is covered by at least two base stations, which enables a tracking ability. The base stations are also in communication with each other. The communication may be via a communication backbone (110), for instance a fibre optic communication link, or via a wireless communication link, which may be according to the whitespace communication standard. Additionally, each base station (102) may be in communication with a broader communication network. The figure also illustrates a plurality of user terminals (106), each of which may be in communication with at least one of the base stations (102). The communication is preferably wireless communication and may be according to the whitespace communication standard. Consequently, each of the user terminals (106) is operable to communicate with a wider communications network, which may include, for example, the internet.

The base stations (102) include all the necessary components integrated in the appropriate manner to provide a working whitespace communication system. Each base station (102) may include, for example, a power amplifier, a tuneable filter, a low pass filter, an analogue to digital converter, physical (PHY) layer components or logic, media access control (MAC) layer components or logic, spectrum sensing components or logic, spectrum usage recognition and/or spectrum allocation components or logic and the like. The base stations may provide all the components and/or logic to comply with the IEEE 802.22 whitespace communication standard.

Each base station is accordingly configured to transmit and receive communication signals in the form of digitally multiplexed data over a frequency band to and from user terminals according to the whitespace communication standard, the frequency band having been determined to be available for communications by cognitive radio components of the base station.

Each user terminal (106) may be any suitable device which is configured to be in communication with a base station (102) so as to wirelessly transmit and receive information, some examples of which may include computer systems (e.g. laptop computers, desktop computers), entertainment systems (e.g. televisions), home appliances, mobile communication devices (e.g. mobile phones, tablets, personal digital assistants), or the like.

The invention further provides for additional components or logic to be included in each base station (102) so as to provide the system (100) with radar functionality. The present embodiment also provides a central radar server (108). The additional components enable each base station (102) to act as a radar receiver in addition to providing whitespace communications. For example, a communication signal transmitted by a base station (102) may be reflected by a target object. The additional radar components or logic may enable the base station to resolve such a reflection from received electromagnetic signals.

Figure 2:
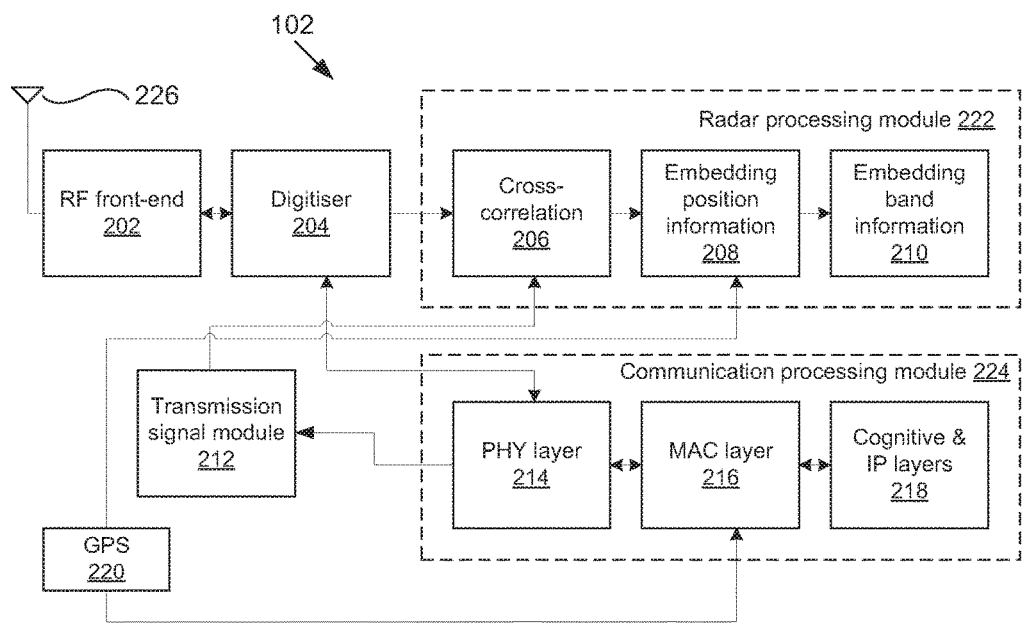
FIG. 2 is a block diagram of one of the base stations of FIG. 1.

An exemplary block diagram of a base station (102) with additional radar components and logic is shown in FIG. 2. The physical components of the base station (102) include an antenna (226) by which communication signals are transmitted and received, a radio-frequency (RF) front-end (202), a digitiser (204), a GPS module (220), and a transmission signal module (212). The base station (102) includes two main logical modules: a radar processing module (222) and a communication processing module (224). The radar processing module (222) includes a cross-correlation component (206), a position information embedding component (208) and a band information embedding component (210). The communication processing module (224) includes a physical (PHY) layer module (214), media access control (MAC) module (216), and cognitive and internet protocol (IP) (218) modules.

The RF front-end (202) may comprise a power amplifier, a band pass filter, a low noise amplifier, an impedance matching circuit, or the like. The antenna (226) provides an interface between the propagation medium (which in this example is the air) and the RF front-end (202). The digitiser (204) may digitise a received frequency band such that the information in the received frequency band may be represented digitally. The GPS module (220) may comprise a GPS receiver and/or a GPS disciplined oscillator and may provide accurate timing information which may, for example, be used in time stamping processed data. The transmission signal module (212) may be configured to digitally store replicas of the transmitted signals, also known as a reference signal.

The communication processing module (224) represents those systems or components which are required to modulate, encode, encapsulate and/or route information or provide error correction so as to allow for transmission and reception of this information via electromagnetic transmissions. The communication blocks in this embodiment of the invention are in accordance with the IEEE 802.22 standard for whitespace communication and will accordingly not be described in detail herein.

The radar processing module (222), which is integrated into each base station (102), provides the symbiotic radar functionality according to the invention. By integrating the radar processing module (222) into the base station (102), the base station (102) is able to resolve reflections of the transmitted signal which reflect off targets objects. Target objects may include, for example, aircraft, vehicles, ships, humans or animals.

Figure 3:
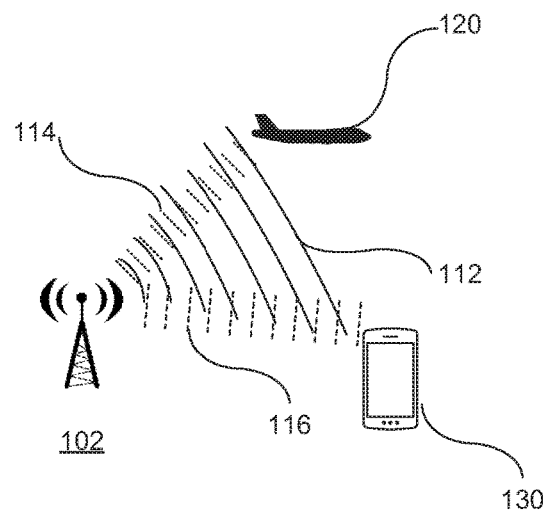
FIG. 3 is a block diagram of a scenario in which embodiments of the invention may operate.

FIG. 3 shows an exemplary scenario in which a base station of the invention (102) emits a communication signal (112). The communication signal (112) may be an electromagnetic transmission with communication information encoded therein, and may be in the TV white space frequency band as previously described. The communication signal (112) is reflected off an aircraft (120). The resulting reflected signal (114) is then received by the base station (102). The figure also shows a user terminal (130) which may be in two-way communication with the base station (102) such that communication information can be received at a user terminal (130) via the communication signal (112) and can also be transmitted from the user terminal (130) to the base station via a terminal-originating communication signal (116). This terminal-originating communication signal (116) is also received by the base station (102) and, along with the reflected signal (114), forms part of a received signal.

Figure 4:
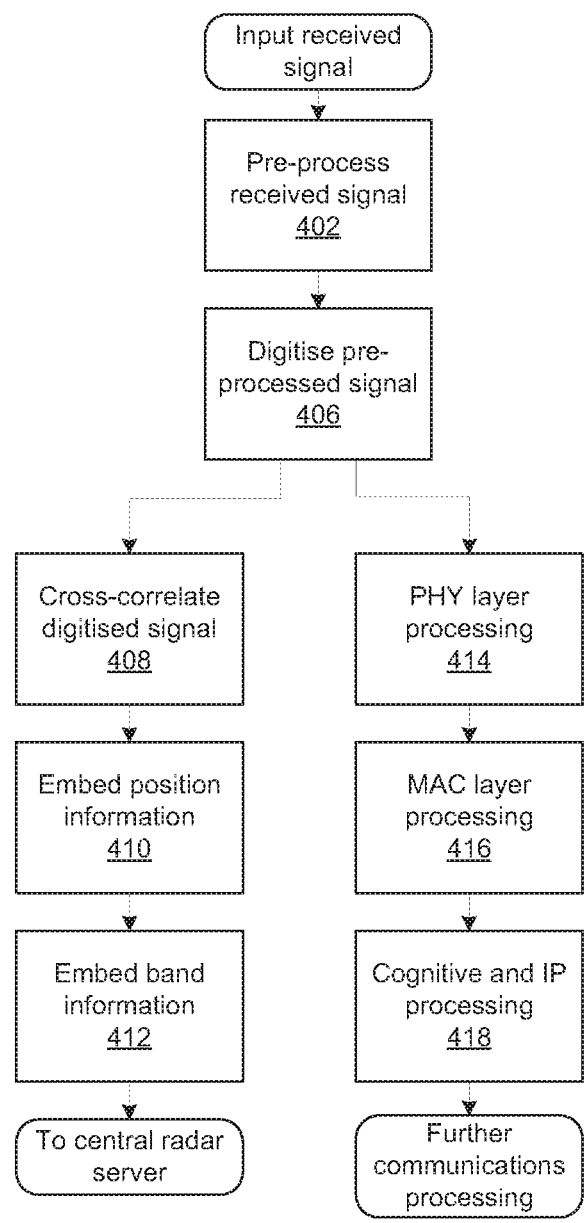
FIG. 4 is a flow diagram illustrating a method for providing symbiotic radar and communication functionality at a base station of FIG. 2.

The received signal is then processed at the base station (102). Exemplary processing steps are illustrated in FIG. 4 with reference to the components of FIG. 2. In a first step (402), the received signal is pre-processed by the radio frequency (RF) front-end (202) of the base station (102). The pre-processing provided by the RF front-end (202) may include impedance matching to ensure that the maximum power is transferred from the antenna, band-pass filtering to reduce input noise and amplifying the received signal. In a next step (406), the pre-processed signal is digitised by a digitiser (204). The subsequent steps are performed in two parallel processing streams corresponding to the radar processing module (222) and the communication processing module (224). In a first radar processing step (408), a section of the digitised signal is cross-correlated with a replica of a section of the transmitted signal (112) stored by the transmission signal module (212). Cross-correlation is a measure of similarity between two signals, thus by cross-correlating the replica of a section of the transmitted signal with the section of the received signal, reflections of that section of the transmitted signal are searched for in the section of the received signal. In this manner, target objects having reflected the transmitted signal may then be resolved from the section of received signal. The subsequent radar processing steps (410 and 412) embed a time stamp, position information of the base station as well as information relating to the frequency band at which the base station (102) is operating at, the bandwidth and modulation scheme being used and other related information into the cross-correlated signal data and communicate this data to a central radar server for further processing. In the communication processing stream (414, 416 and 418), the received signal is processed so as to extract information which may have originated from user terminals of the communication system, for example information which may have been included in the communication signal (116) which was sent by the user terminal (130). The communication processing stream includes PHY layer module, MAC module as well as cognitive and IP layer processing which may facilitate the demodulating, de-multiplexing, decoding the received signal, or error correction of the received signal as well as routing of the information contained therein and which may, for example, be in accordance with the IEEE 802.22 standard.

Figure 5:
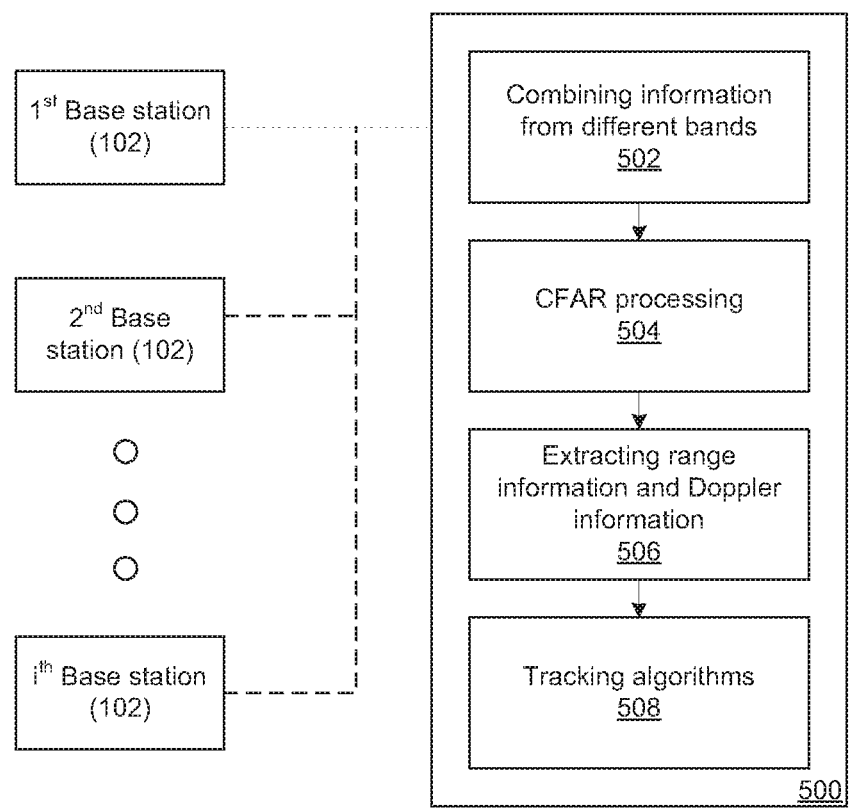
FIG. 5 is a block diagram of a central radar server according to an embodiment of the invention.

FIG. 5 illustrates a block diagram of a central radar server (500) according to the present embodiment of the invention. The central radar server (500) may be configured to receive radar data being communicated from the plurality of base stations (102). The central radar server (500) may be configured to perform a plurality of functions.

For example in performing a first processing step (502), the server (500) may combine data from the cross-correlated signals which originate from the plurality of base stations (102) to form one or a series of range profile(s) or amplitude-range-Doppler plots. In performing this function, the server (500) may make use of the time stamp, as well as position and band information which was embedded in the cross-correlated signal data. As each base station may be operating in different bands, each of the cross-correlated signals may, for example, have to be shifted by an amount which may be determinable from the embedded band information. In addition to this, as each base station (102) is positioned at a different geographical location, the embedded position information may be used to shift the information to properly align the cross-correlated signals. Other processing may also have to be performed on the individual cross-correlated signals so that they can be combined into a single range resolution profile, where such processing may include compressive sensing or the like.

Having combined the cross-correlated signals into range profiles, the server (500) may then perform a constant false alarm rate (CFAR) detection in a next processing step (504). The CFAR algorithm is a detection algorithm for detecting target objects in, for example, a range profile. The algorithm provides a threshold which varies according to the noise present in the range profile, thereby providing a false alarm rate (or probability of false detection) which is constant in spite of varying noise levels.

A further processing step (506) provides for target object range and Doppler information to be extracted from the CFAR detection data such that for each target object detected, there may be an associated range value and Doppler value. The associated range and Doppler values are then used in a next processing step (508) as inputs to tracking algorithms.

It is possible that in some embodiments of the invention, communication signals (116) which originate from user terminals (130), also termed the uplink or back link signals, which may be in different frequency bands to the base station-transmitted signal (112), may be used for radar purposes, for example, to synchronise the radar system and also provide improved coverage of the radar functionality. Synchronisation using the terminal-transmitted signal (116) may, for example, make use of network time protocol (NTP) or the like. Furthermore, embodiments of the invention provide for user terminals (130) to digitise base-station transmitted signals (112) received at the user terminals (130) and for the user terminals (130) to communicate this digitised signal to the central server (108) so as to provide further information for radar processing.

Embodiments of the invention further provide for each base station to have access to replicas of transmitted signals of other base stations. For example, a base station may share its transmitted signal replica with the plurality of other base stations, and similarly may have access to the replicas of the other base stations' transmitted signals. Such functionality may enable a base station to resolve a target object reflection embedded in its received signal, the reflection off the target object having originated from signal transmitted by another base station. In this manner multiple target object reflections from signals having been transmitted by multiple base stations may be received by multiple base stations which may improve the detection capability of the system. The replicas of the transmitted signals may, for example, be communicated to the base stations via the communication backbone. Such an embodiment may facilitate coherent beam forming of energy off the target object reflection. Similarly, replicas of the transmitted signals may be communicated to the central radar server.

Embodiments of the invention also provide for the base stations to digitally multiplex radar specific signals into the transmitted signal in addition to communication signals, and for the radar specific signals to provide an optimised range and Doppler response.

Furthermore, signals transmitted from user terminals may be reflected off target objects, such reflections may then be received at a base station. Embodiments of the invention accordingly provide for replicas of user terminal-transmitted signals to be stored by a base station and cross correlated with received signals so as to resolve target objects having reflected the terminal-transmitted signals.

Utilising the terminal-transmitted signals, which may be in different frequency bands to base station-transmitted signals, in performing radar functionality provides for at least two diverse propagation channels between each base station-user terminal pair which improves detection and further allows for network synchronisation.

Embodiments of the invention may further provide for a plurality of major and minor base stations. A major base station may have a higher transmit power and may be in wireless communication with minor base stations in close proximity thereto so as to provide cell and internode communications.

In other embodiments of the invention, radar receivers may be integrated into other communication systems, for example mobile cellular communication networks, WiMAX communication networks or the like.

The invention accordingly provides a plurality of base stations in communication with each other and a wider communication network, each base station being configured to transmit and receive communication information to and from a plurality of user terminals and further configured to perform radar data processing on received signals so as to resolve target object reflections contained therein. By processing the resolved target object reflections range and Doppler measurements for a target object from the perspective of multiple base stations may be obtained, which can then be used to locate target objects using multilateration techniques and to initiate and update target tracks using tracking algorithms.

In addition to providing high speed wireless data-network access in sparsely populated areas (for example, at speeds of up to 10 Mbps), the invention provides the capability to be used as a radar system in such areas which are typically difficult to monitor for homeland security.

The invention claimed is:

1. A symbiotic radar and communication system comprising
    a plurality of base stations in communication with a wider communication network, each base station including a transmitter configured to transmit communication signals that include digitally multiplexed data over a frequency band to a plurality of user terminals, and a receiver configured to receive communication signals from a plurality of user terminals over a frequency band that at least partially overlaps with the transmitted frequency band,
    wherein each base station performs communication data processing, and
    wherein each base station performs radar data processing by acting as a radar receiver and resolving from the received signals reflections of the transmitted signals which reflect off a target object.

2. The system as claimed in claim 1, in which each base station includes
    a radio frequency (RF) front-end configured to process the transmitted and received signals,
    a digitizer configured to digitize the received signals,
    radar processing modules configured to perform radar data processing on the received signals, and
    communication processing modules configured to perform communication processing on the received signals.

3. The system as claimed in claim 2, in which the radar processing modules include
    a cross-correlation component which performs a cross-correlation of the digitized received signal and a stored replica of a section of the transmitted signal,
    a position information embedding component which embeds a time stamp and position information of the base station into the cross-correlated data, and
    a band information embedding component which embeds information as to the frequency band of the transmitted signal into the cross-correlated data.

4. The system as claimed in claim 2, in which the communication processing modules include
    a physical layer module,
    media access control (MAC) module, and
    a cognitive and internet protocol module which is operable to determine those bands of an available electromagnetic spectrum in which to transmit and receive signals.

5. The system as claimed in claim 1,
    wherein the transmitted frequency band is in the Whitespace frequency band of about 50 MHz to about 850 MHz and the received signals include reflections of the transmitted signals.

6. The system as claimed in claim 1,
    in which the received signals include signals transmitted by one or more of the user terminals, and
    in which the base station uses the signals transmitted by one or more of the user terminals for synchronization of the symbiotic radar and communication system using network time protocol (NTP).

7. The system as claimed in claim 6 in which the base station stores replicas of the user terminal transmitted signals,
wherein each base station includes radar processing modules including a cross-correlation component for cross-correlating the received signal with the stored replicas of the user terminal transmitted signals so as to resolve target objects that have reflected the user terminal transmitted signals.

8. The system as claimed in claim 1, which includes a central radar server in communication with the plurality of base stations and configured to further process radar data received from the base stations so as to track objects moving relative to the base stations.

9. The system as claimed in claim 8, in which the central radar server includes a combining module which combines data from cross-correlated signals that originate from the plurality of base stations to form one or a series of range profiles or amplitude-range-Doppler plots, so as to shift the data received from the plurality of base stations to properly align the cross-correlated data so as to resolve target object reflections contained therein.

10. The system as claimed in claim 9, in which the central radar server includes a constant false alarm rate (CFAR) detection module, which detects target objects in the range profile.

11. The system as claimed in claim 10, in which the central radar server includes a range and Doppler extraction module which extracts target object range and Doppler information from the CFAR detection data and uses this information to track moving objects.

12. The system as claimed in claim 1,
in which the received signals of one base station includes signals transmitted by one or more other base stations, and
in which the base stations are in communication with each other through a communication backbone so that replicas of the signals transmitted by each base station are available at least at some other base stations for use in cross-correlation, so that a target object reflection received at a base station can be resolved even where the reflection originates from a signal transmitted by a different base station.

13. The system as claimed in claim 1, in which each base station digitally multiplexes radar-specific signals into the transmitted communication signals, the radar-specific signals providing an optimized range and Doppler response to be extracted.

14. A method for providing symbiotic radar and communication functionality comprising, at a base station:
transmitting communication signals that include digitally multiplexed data over a frequency band to a plurality of user terminals;
receiving communication signals from a plurality of user terminals over a frequency band that at least partially overlaps with the transmitted frequency band;
performing communication data processing on received signals; and,
substantially simultaneously and in parallel, performing at least initial radar data processing by acting as a radar receiver and resolving from the received signals reflections of the transmitted signals which reflect off a target object.

15. The method as claimed in claim 14 in which the initial radar data processing includes
cross-correlating the received signal with a stored replica of a section of the transmitted signal,
embedding position information and time stamp information into the cross-correlated data, and
embedding band information as to the frequency band of the transmitted signal into the cross-correlated data, and
wherein the resultant data is transmitted to a central radar server for further radar processing so as to resolve target object position information.

16. A method carried out on a central radar server comprising:
receiving initially processed radar data from a plurality of base stations, each base station transmitting and receiving communication signals to and from a plurality of user terminals, wherein the initially processed radar data is generated by each base station cross-correlating received signals with stored replicas of transmitted signals and embedding position information and time stamp information into the cross-correlated data;
adjusting the received data based on the position and time stamp information to compensate for the position of each base station and the time that the received data was generated;
combining the received data from at least several of the base stations into a single range profile; and
using the range resolution profile to resolve target object position information.

* * * * *